Figures 1, 2:
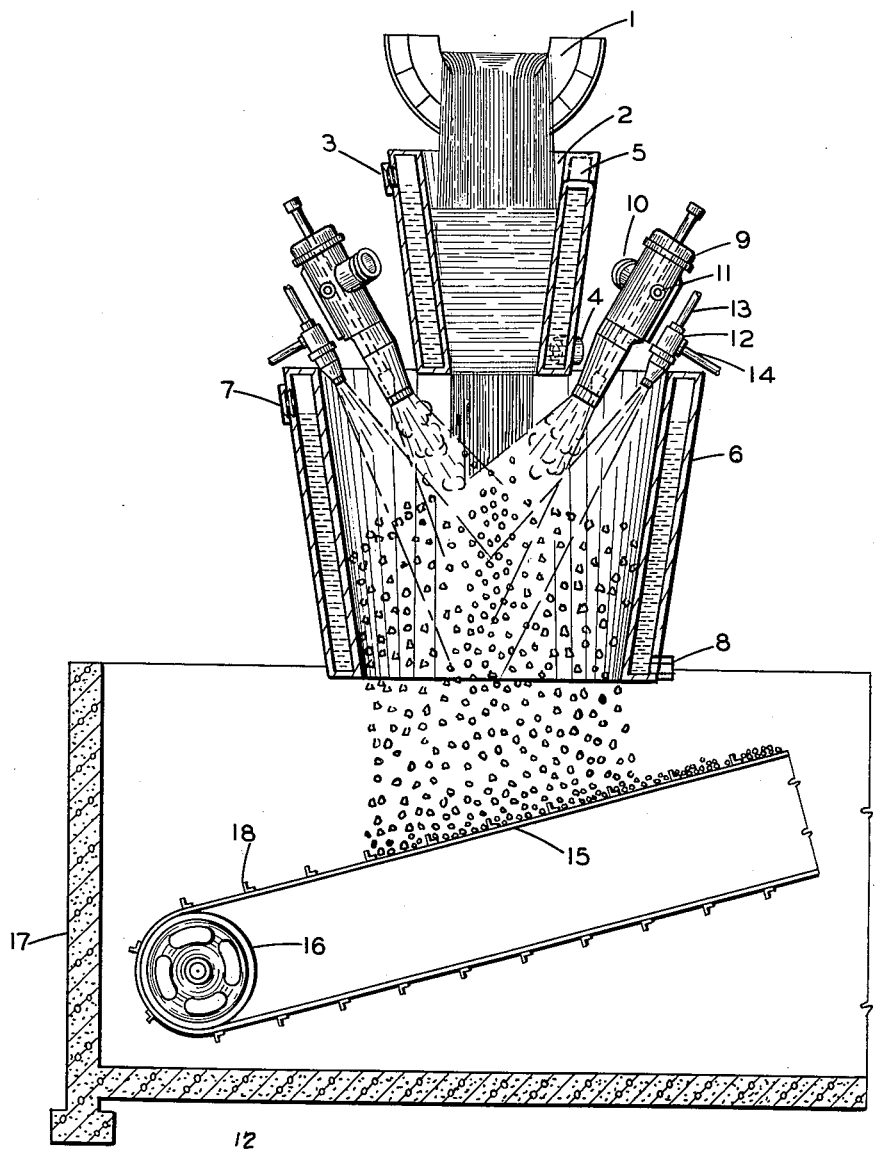

April 11, 1961 F. OSBORNE 2,978,743
APPARATUS FOR MAKING LIGHT WEIGHT AGGREGATE
Filed Dec. 28, 1954

INVENTOR.
FRED OSBORNE
BY
Christy Parmelee & Strickland
ATTYS.

United States Patent Office 2,978,743
Patented Apr. 11, 1961

2,978,743

APPARATUS FOR MAKING LIGHT WEIGHT AGGREGATE

Fred Osborne, Birmingham, Ala., assignor to S. P. Kinney Engineers, Inc., Carnegie, Pa., a corporation of Pennsylvania Filed Dec. 28, 1954, Ser. No. 478,138

1 Claim. (Cl. 18—2.5)

This invention relates to a method and apparatus for producing light weight aggregate of high crushing strength and more particularly to a new and novel method of vertically disintegrating and cellulating a shaped freely-falling stream of molten slag so as to produce the light weight aggregate.

The present application is a continuation-in-part of my copending application Serial No. 255,029, filed November 6, 1951 for Method and Apparatus of Making Light Weight Cellular Aggregate, now Patent No. 2,702,407. The first-filed application is directed to a method of cellulation applied to a disintegrated horizontally-projected stream, and the present application is directed to cellulation of a disintegrated vertically falling stream.

An object of the present invention is to provide a method for shaping the slag stream into a substantially cylindrical form and apply the disintegrating forces peripherally of the stream so as to thereby control both the size and quality of the relatively small discrete masses being subjected to the cellulating action.

Another object of the invention is to provide a novel apparatus for practicing the method.

These and other objects of the invention will be made apparent from the following description, in which Fig. 1 shows a vertical cross section through the apparatus; and Fig. 2 is a schematic showing of the arrangement of slag stream disintegrating nozzles and the cellulating nozzles in relation to the blow chamber.

Referring now in detail to the drawings, reference character 1 indicates a substantially semi-circular trough for conveying the molten slag to the cellulating apparatus. This trough may be of any suitable design, and forms no part of the cellulating apparatus. Vertically disposed beneath the discharge end of the trough 1 is a hollow water-cooled slag collecting and shaping chamber 2 in the form of an inverted frustrum of a cone; that is, the spaced peripheral walls of the cylinder converge inwardly and downwardly. This chamber is provided with a suitable inlet 3 and outlet 4 for water circulation between the spaced walls. The chamber serves to accumulate and shape the stream of molten slag issuing therefrom. Adjacent the top of the chamber is a suitable slag overflow opening 5, which has associated therewith any suitable means (not shown) for carrying the excess slag away from the apparatus. This overflow opening is to take care of any excess which may be delivered to the apparatus. It is more in the nature of a safety device to prevent damage to the apparatus should an excess of slag for any reason be momentarily presented to the apparatus.

Disposed below the chamber 2 and substantially concentric therewith is a hollow water-cooled blow or cellulating chamber 6 having suitable water inlet and outlet openings 7 and 8 providing circulation of water through spaced walls of the chamber. This chamber may also be in the form of an inverted frustrum of a cone. Disposed above and within the periphery of the chamber 6 are mounted suitable slag stream disintegrating nozzles 9, which may be of any suitable design. Steam or other gaseous fluids may be projected through the nozzle by means of the inlet 10 and the nozzles 9 are suitable inclined so that the gaseous fluid issuing therefrom converges on the freely-falling circular stream of molten slag within and adjacent the top of the chamber 6. As shown in Fig. 2 of the drawings, these nozzles are preferably four in number and are spaced 90° around the slag stream. These nozzles are also preferably provided with a suitable water inlet 11 connected with a water line (not shown), for a purpose hereinafter disclosed.

Also spaced about the stream of falling slag are the cellulating nozzles 12 which project an atomized spray of water upon the discrete molten masses of the slag formed by disintegration of the slag stream under the pressure of the gaseous fluid issuing from the nozzles 9. These nozzles 12 have a suitable water inlet 13 and an air inlet 14. As shown in Fig. 2 of the drawings, these nozzles are eight in number and are equally spaced about 45° apart about the opening in the chamber 6 and are inclined to project their atomized spray within the cylinder 6 and upon the discrete molten masses of slag moving vertically therethrough.

Disposed beneath the chamber 6 is a suitable endless conveyor 15 having suitable driving mechanism such as 16. This conveyor is preferably housed within a suitable tank or pit 17 and extends upwardly therefrom to a discharge outlet. If desired, suitable cross members 18 may be mounted on the conveyor to retain the cellulated slag during movement of the conveyor.

In operation of the apparatus and practicing of the method, molten slag is conveyed from the furnaces through the trough 1 and falls freely into the water-cooled chamber 2 where it is accumulated and shaped into a stream substantially circular in cross section which falls freely into the blow or cellulating chamber 6. Here the gaseous fluid under pressure, such as steam, converges upon the falling stream of slag, and the pressure of the steam is sufficient to disintegrate the stream into relatively small discrete masses of very hot or substantially molten slag which tend to fall vertically through the chamber 6. The spray nozzles 12 project a very fine atomized spray of water into the chamber 6 so as to substantially fill the chamber below the point of disintegration of the slag into the hot or molten discrete masses. The pressure of the air atomizing the water is sufficient to project the spray through the chamber 6 so that the discrete masses of molten slag fall through substantially a dense fog of these small water particles, and upon contact therewith the molten slag is progressively cellulated. The individual small droplets of water are not sufficient in size to materially cool or quench the hot slag, hence the plurality of applications of the water particles to the falling slag masses progressively cellulates the masses as they fall freely through the chamber 6 onto the conveyor 15 therebelow. The moving conveyor carries the cellulated slag falling thereon beyond further contact with the water and to a suitable discharge point.

As clearly and fully set forth in the above-identified copending application, molten slag falling into a pool of water so as to be quenched thereby literally explodes into a cellular friable mass of little strength. However, the quantity and size of the water particles to which the molten discrete masses of slag are exposed in the present method do not completely chill the slag, so that although it is cellulated or expanded, the cellulated masses have great strength and are useful as a light weight aggregate for various purposes. As fully set forth in my earlier application, the cellulated slag being deposited upon the conveyor is somewhat cooled during the cellulation process, but contains enough residual heat so that the discrete cellulated masses will agglomerate into large lumps by reason of the retained heat. These lumps are required to be broken and screened before their intended use.

Water inlet openings are provided in the vapor nozzles 9 so that on occasions when the viscosity of the slag is such as to not be readily disintegrated by the gaseous fluid issuing from the nozzles, a small quantity of water may be injected into the nozzles and projected upon the falling slag stream. This water is not of sufficient volume to materially cool the slag, but apparently has a reaction upon the slag so as to better enable the gaseous fluid to break it into the required discrete masses. The pressure of the vapor stream while sufficient to break up the slag stream into relatively small discrete masses, is not of sufficient intensity so as to cause the stream to form into filaments or threads as is well known in the prior art where high pressures are used to disintegrate the slag into thread-like particles used for insulation.

It will be apparent to those skilled in the art that various modifications may be made in the apparatus herein disclosed, such as modification in the outlet opening of the nozzles 9, in the peripheral spacing and arrangement of the nozzles 9 and 12, and possibly in the size, shape or vertical separation of the chambers 2 and 6. All of this may be done without departing from the invention herein disclosed, and for these reasons the exact details of construction herein disclosed are for purposes of illustration and not limitation except as made necessary by the scope of the appended claim.

I claim:

Apparatus for converting molten furnace slag into high strength light weight aggregate, comprising means for collecting and discharging molten slag as a free falling column of substantially uniform cross-section, an open ended vertically disposed cellulating chamber into which the slag column is received for free falling gravitational passage therethrough, a plurality of slag disintegrating nozzles disposed about the upper end of said chamber for projecting converging streams of gaseous fluid under pressure upon the molten slag column within said chamber and disrupting same into small substantially molten discrete masses, a plurality of slag cellulating nozzles disposed about the upper end of said chamber for projecting a fog of atomized water into the chamber upon the said discrete masses freely falling therethrough, and conveyor means beneath said chamber for receiving and removing the cellulated slag from further contact with said water, said slag disintegrating nozzles having means for inclusion in the gaseous fluid small quantities of water in amounts insufficient to materially cool the falling slag stream.

References Cited in the file of this patent

UNITED STATES PATENTS

| | | |
|---|---|---|
| 1,627,982 | Maguet | May 10, 1927 |
| 2,124,768 | Drill et al. | July 26, 1938 |
| 2,315,735 | Richardson | Apr. 6, 1943 |
| 2,358,900 | Zettel | Sept. 26, 1944 |
| 2,450,978 | Meinzer | Oct. 12, 1948 |
| 2,498,904 | Wheeler | Feb. 28, 1950 |